United States Patent [19]

Nagano et al.

[11] Patent Number: 4,852,537
[45] Date of Patent: Aug. 1, 1989

[54] IGNITION TIMING CONTROL APPARATUS FOR INTERNAL COMBUSTION ENGINE

[75] Inventors: Masami Nagano; Takeshi Atago, both of Katsuta, Japan

[73] Assignee: Hitachi, Ltd., Tokyo, Japan

[21] Appl. No.: 52,394

[22] Filed: May 21, 1987

[30] Foreign Application Priority Data

May 23, 1986 [JP] Japan .................. 61-117312

[51] Int. Cl.⁴ .............................................. F02P 5/15
[52] U.S. Cl. ...................................... 123/419; 123/422
[58] Field of Search ................. 123/422, 419, 426

[56] References Cited

U.S. PATENT DOCUMENTS

| | | | |
|---|---|---|---|
| 3,785,356 | 1/1974 | Niemoeller | 123/426 |
| 4,389,992 | 6/1923 | Shigematsu et al. | 123/422 |
| 4,489,691 | 12/1984 | Ono et al. | 123/422 |
| 4,509,477 | 4/1985 | Takao et al. | 123/339 |
| 4,608,956 | 9/1986 | Katoh et al. | 123/422 |
| 4,626,997 | 12/1986 | Takeda et al. | 123/422 |
| 4,682,577 | 7/1987 | Kato et al. | 123/422 |

FOREIGN PATENT DOCUMENTS 60-159372 8/1985 Japan .

*Primary Examiner*—Martin P. Schwadron
*Assistant Examiner*—Allen J. Flanigan
*Attorney, Agent, or Firm*—Antonelli, Terry & Wands

[57] ABSTRACT

Disclosed is an ignition timing control apparatus for an internal combustion engine for a vehicle in which, when an acceleration is detected, a correction quantity for ignition time advance or retardation corresponding to an increment or a decrement of and the changing direction of the rotation speed is computed to correct basic ignition timing, thereby suppressing an acceleration shock or vehicle body vibration.

10 Claims, 13 Drawing Sheets

IGNITION TIMING CONTROL APPARATUS FOR INTERNAL COMBUSTION ENGINE

BACKGROUND OF THE INVENTION

1. FIELD OF THE INVENTION

This invention relates to an ignition timing control apparatus for an internal combustion engine driving a vehicle, and more particularly to an apparatus of the kind described above which includes means for suppressing or preventing vibration of the body of the vehicle immediately after the vehicle is accelerated.

2. DESCRIPTION OF THE PRIOR ART

A prior art method of controlling the ignition timing of an internal combustion engine at the time of accelerating a vehicle is disclosed in JP-A-60-159372. According to the method disclosed therein, the ignition timing is retarded by a predetermined value from its original setting at the time of accelerating the vehicle and is then gradually restored to its original setting in accordance with the passage at every predetermined increments of time or with each ignition in the cylinder of the engine. However, the prior art method was intended to alleviate an acceleration shock occurring at the time of acceleration of the vehicle and does not consider the on longitudinal vibration of the body of the vehicle occurring after the acceleration. Selection of a large value of ignition timing retardation so as to suppress the longitudinal vibration of the vehicle body results in a loss of the feeling of acceleration or of misfiring problems, and the method has not been successful in completely preventing the undesirable longitudinal vibration of the vehicle body.

Thus, the prior art method does not consider on the longitudinal vibration of the vehicle body occurring immediately after acceleration of the vehicle and has not been satisfactory for ensuring vibration-free acceleration of the vehicle.

SUMMARY OF THE INVENTION

It is a primary object of the present invention to provide an ignition timing control apparatus for an internal combustion engine for a vehicle, which prevents an acceleration shock occurring at the time of accelerating the vehicle also being generated by a step-like increment of engine torque also and also prevents longitudinal vibration of the body of the vehicle occurring immediately after acceleration of the vehicle being caused by elastic vibration of the engine.

The above object of the present invention is attained by detecting whether or not the vehicle is under acceleration, and, when the vehicle is being accelerated, controlling the ignition timing on the basis of the quantity and direction of variation of the rotation speed of the engine. For the purpose of this ignition timing control, the rotation speed N of the engine is differentiated for time to detect an engine rotation speed variation by the value of dN/dt and a correction quantity is determined by the value of dN. Then, on the basis of the sign of dN/dt, ignition timing retrieved from a map of various values of ignition timing is corrected, that is, advanced or retarded by the value of the correction quantity. More precisely, when the sign of dN/dt is positive (because the rotation speed of the engine is increasing), the correction quantity is subtracted from the value of ignition timing retrieved from the map thereby retarding the ignition timing. On the other hand, when the sign of dN/dt is negative (because the engine rotation speed is decreasing), the correction quantity is added to the value of ignition timing retrieved from the map thereby advancing the ignition timing.

Thus, by increasing the torque when the engine rotation speed is decreasing, and by decreasing the torque when the engine rotation speed is increasing during, variations of the engine rotation speed, an acceleration shock and vehicle body vibration can be prevented.

DESCRIPTION OF THE PREFERRED EMBODIMENTS

Figure 6:
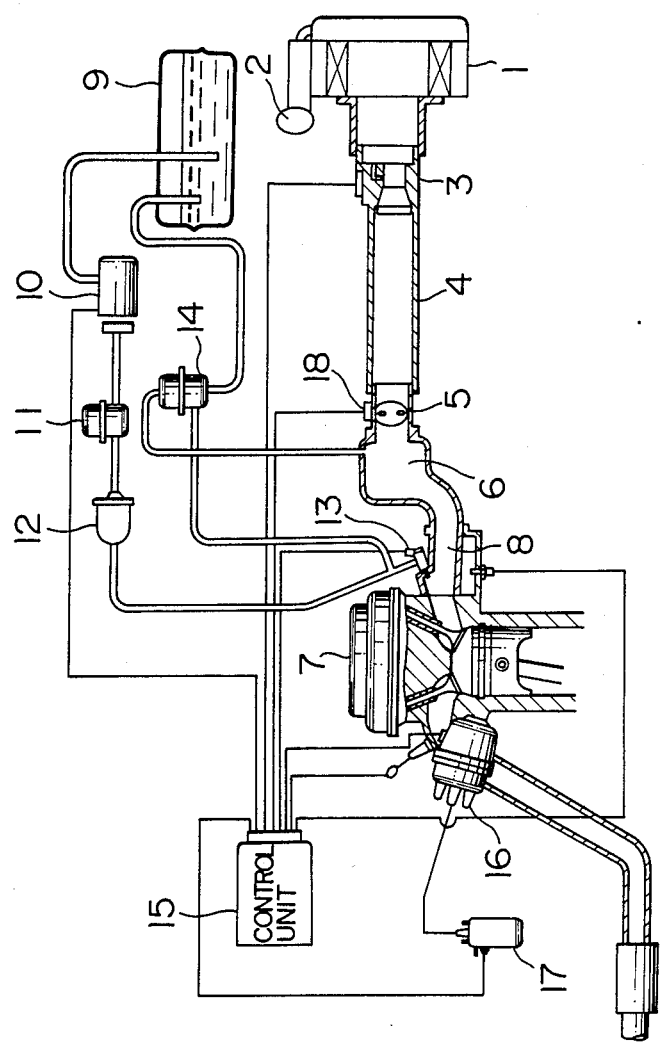
FIG. 6 shows diagrammatically a fuel injection system to which an embodiment of the present invention is applied.

A fuel injection system, to which an embodiment of the present invention is applied, will be first described with reference to FIGS. 6 and 7. Referring to FIG. 6, air taken from an inlet 2 of an air cleaner 1 flows into a collector 6 through a hot wire type air flowmeter 3 detecting the quantity of intake air, through a duct 4, and through a throttle body 5 having a throttle valve controlling the flow rate of air. From the collector 6, air is distributed to suction pipes 8 to be sucked into individual cylinders respectively of an internal combustion engine 7. On the other hand, fuel pumped out from a fuel tank 9 and pressurized by a fuel pump 10 is supplied to a fuel system which includes a fuel damper 11, a fuel filter 12, fuel injection valves 13 and a fuel pressure regulator 14. The fuel whose pressure is regulated to a predetermined value by the fuel pressure regulator 14 is injected from the fuel injection valves 13 into the respective suction pipes 8. The air flowmeter 3 generates an output signal indicative of the detected quantity of intake air, and this output signal is applied to a control unit 15. A throttle sensor 18 sensing the opening of the throttle valve is mounted on the throttle body 5 and applies its output signal to the control unit 15. A crank angle sensor built in a distributor 16 generates a reference signal indicative of fuel injection timing or ignition timing and a signal indicative of the rotation speed of the engine 7, and applies these signals to the control unit 15.

Figure 7:
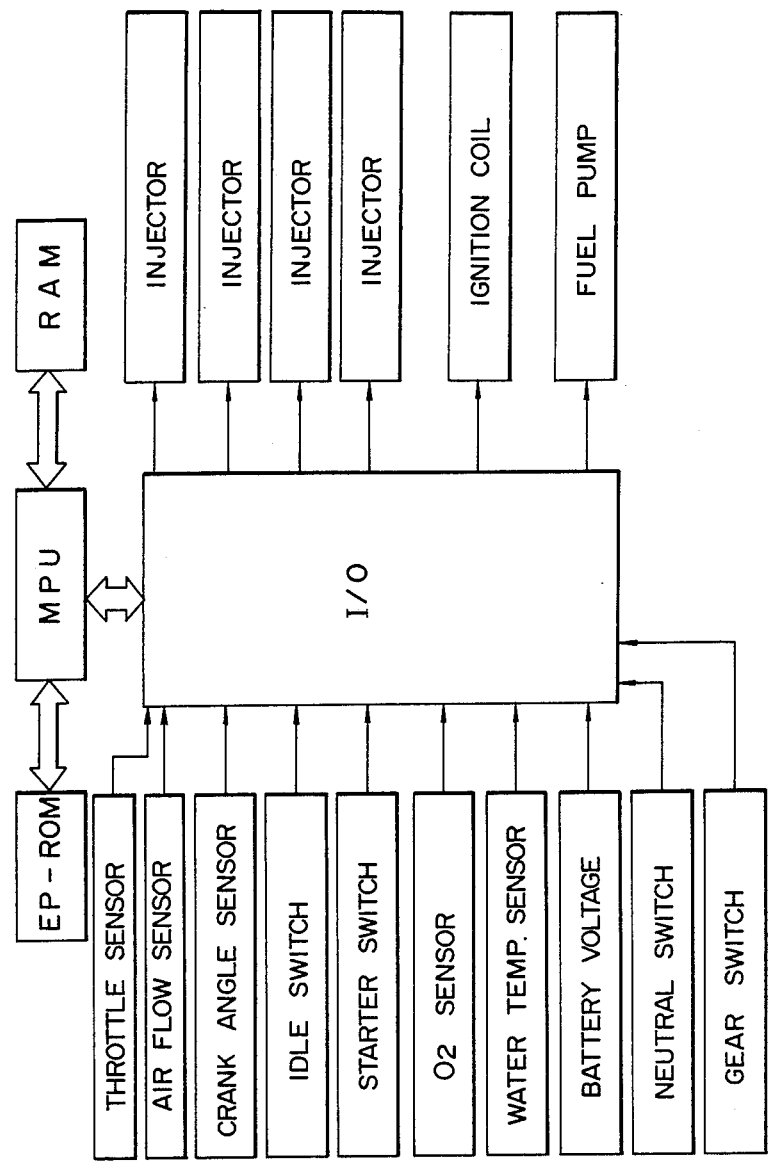
FIG. 7 shows the structure of the control unit shown in FIG. 6 and shows also various elements connected thereto.

Referring to FIG. 7, the control unit 15 is composed of an MPU, an EP-ROM, an RAM, and an I/O interface including A/D converters and I/O circuits. It will be seen in FIG. 7 that, besides the output signals from the air flowmeter 3, throttle sensor 18 and distributor 16 (crank angle sensor), output signals from an idle switch, a starter switch, an $O_2$ sensor, a cooling water temperature sensor, a battery voltage, a neutral switch and a gear switch are also applied to the control unit 15. After execution of predetermined arithmetic and logical processing, the control unit 15 applies its output signals to the fuel injection valves 13, and each of the injection valves 13 injects fuel of required quantity into the associated suction pipe 8. The control unit 15 also applies an ignition timing control signal to a power transistor in an ignition coil 17 to control the ignition timing. The control unit 15 also applies its output signal to the fuel pump 10 to control the operation of the pump 10.

How to control the ignition timing of the engine 7 according to the present invention will now be described for each of various control items.

Basic control

The manner of basic control according to the present invention will be first described with reference to FIGS. 1 to 5.

Figure 1:
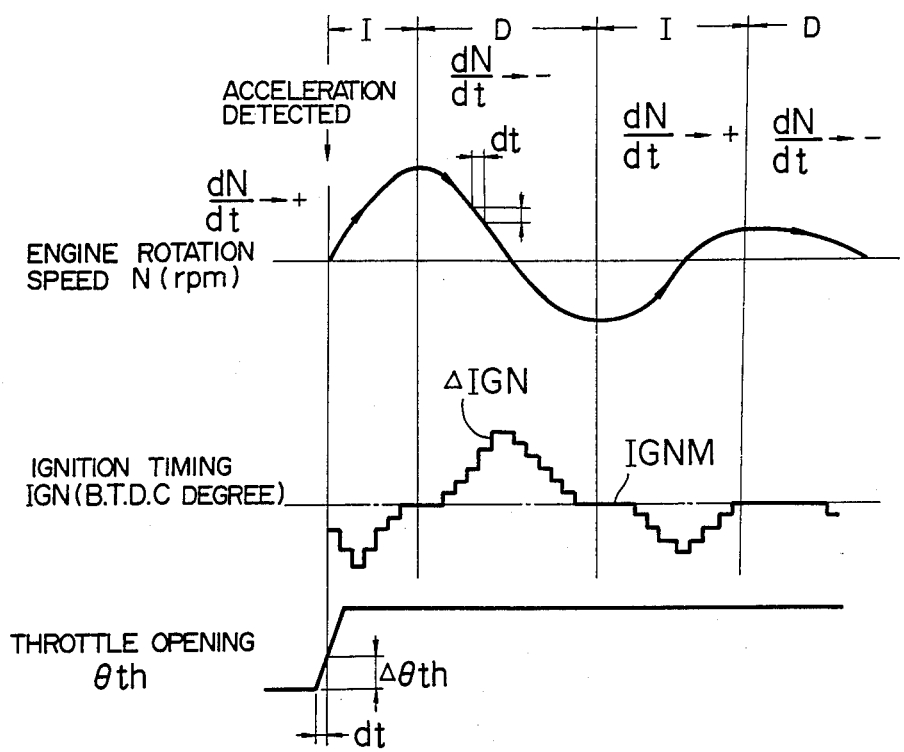
FIGS. 1, 2, 9, 10, 14, 16 and 18 are graphs illustrating the ignition timing control according to the present invention.

FIG. 1 shows variations of the rotation speed N of the engine 7 at the time of acceleration and a method of controlling the ignition timing.

When the throttle valve in the throttle body 5 is opened to accelerate the vehicle, the rotation speed of the engine 7 varies periodically as shown in FIG. 1. An abrupt initial increase (step-like increment of engine torque) in the engine rotation speed is felt as an acceleration shock (elastic vibration), and a later great variation in the engine rotation speed is felt as longitudinal vibration of the body of the vehicle.

According to the basic control of the present invention, therefore, the acceleration is first detected in the form of, for example, a change of the throttle valve opening per unit time, a change of the intake air quantity per unit time and/or a change of the fuel injection pulse width Tp, so as to correct the ignition timing on the basis of these values. Also, for the purpose of correcting the ignition timing, the engine rotation speed N is sampled at intervals of a predetermined period of time to compute its change relative to time, that is, a so-called differentiated value $dN/dt$. Then, on the basis of the value and sign of $dN/dt$, the ignition timing is corrected.

Referring to FIG. 1, the engine rotation speed N increases in a section I and decreases in a section D.

Therefore, in the section I, the sign of $dN/dt$ is positive, and a correction quantity corresponding to the value of dN is subtracted from the value of basic ignition timing IGNM thereby retarding the ignition timing. On the contrary, in the section D, the sign of $dN/dt$ is negative, and a correction quantity corresponding to the value of dN is added to the value of the basic ignition timing IGNM thereby advancing the ignition timing.

On the other hand, in the vicinity of the inflection point of the curve representing the engine rotation speed N, the value of dN is smaller than a predetermined value. Therefore, the ignition timing is not corrected, and the ignition timing signal representing the basic ignition timing IGNM is generated intact.

The value of the basic ignition timing IGNM is determined on the basis of the load and rotation speed of the engine and is read out from a memory storing various values of the basic ignition timing IGNM.

Figure 2:
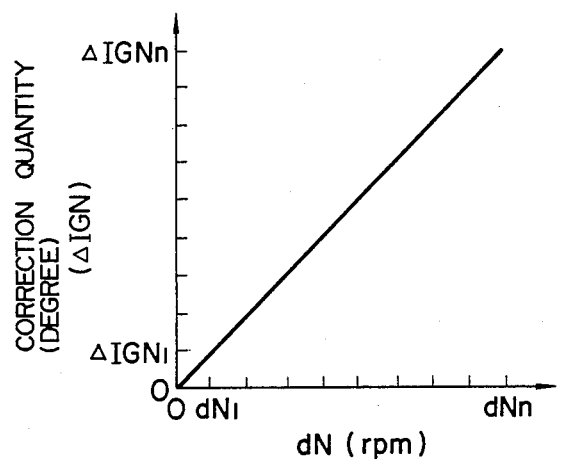

An ignition timing correction quantity ΔIGN corresponding to a change of the engine rotation speed N is also read out from the memory. As shown in FIG. 2, the correction quantity ΔIGN increases with an increase in the value of the rotation speed change ΔN.

A flow chart used for execution of the basic control described above will be described with reference to FIG. 5. Also, the results of an acceleration performance test based on the basic control described above will be described with reference to FIGS. 3 and 4.

Figure 5:
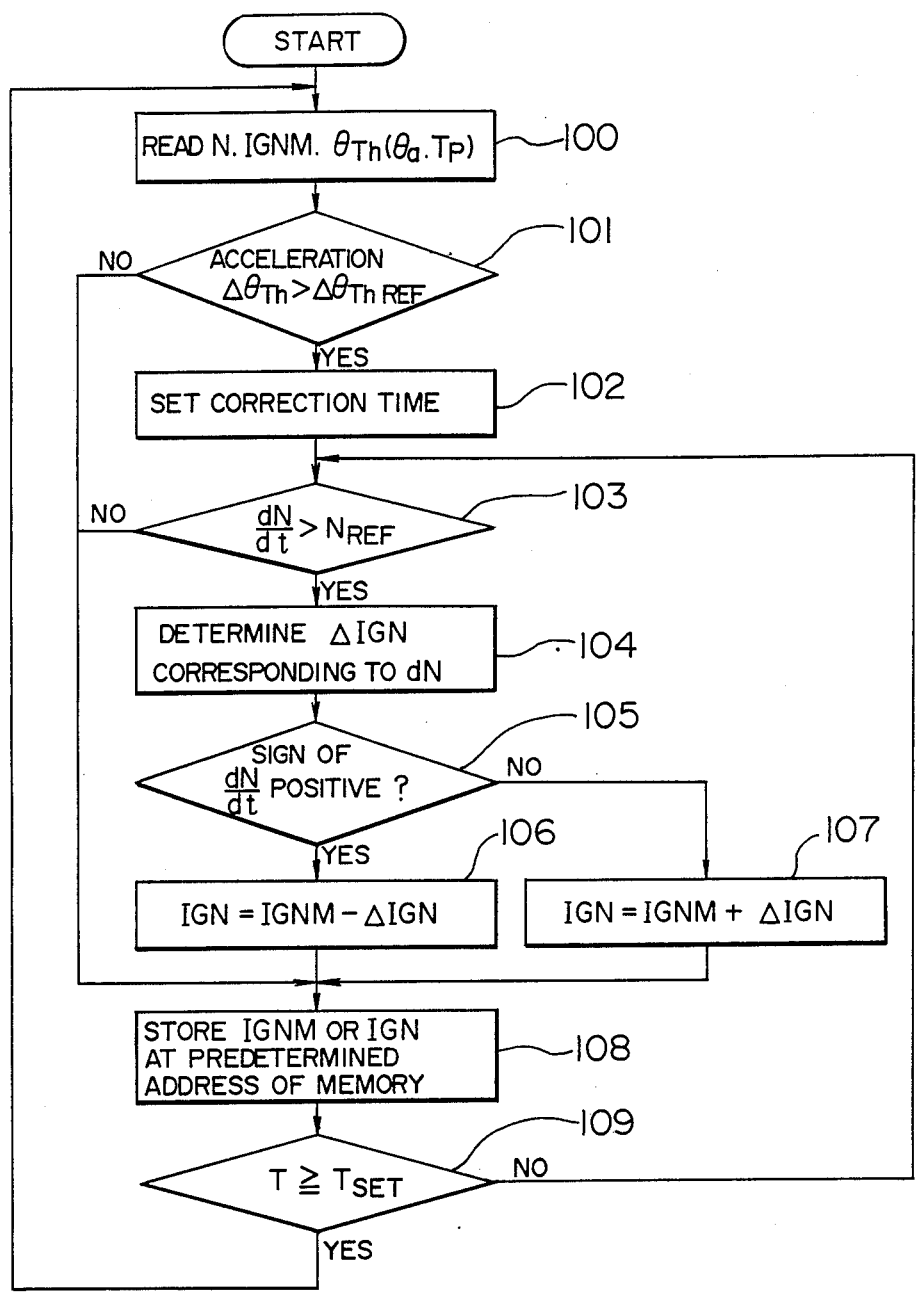
FIGS. 5, 8, 11, 13 and 17 are flow charts of various manners of the ignition timing control according to the present invention.

In a step 100 of the flow chart of FIG. 5, the value of the engine rotation speed N obtained from the output signal of the crank angle sensor in the distributor 16 is read out from the memory together with the value of the basic ignition timing IGNM determined on the basis of the output signals of the crank angle sensor and air flow sensor 3. In this step 100, the value of the throttle valve opening θth provided by the output signal of the throttle sensor 18 is also read. These values are read at intervals of a predetermined period of time. Symbols Qa and Tp designate the quantity of intake air and the basic injection pulse width respectively. This pulse width Tp is given by $T_p = Qa/N$.

In a step 101, Δθth, which is a minute change per unit time of the throttle valve opening θth read in the step 100, is computed and compared with a predetermined reference value $\Delta\theta th_{REF}$. When the result of comparison proves that Δθth is larger than $\Delta\theta th_{REF}$, the vehicle is under acceleration. For the purpose of decision as to whether or not the vehicle is under acceleration, the intake air quantity Qa or the basic injection pulse width Tp may be used in lieu of the throttle valve opening θth.

In a step 102, a predetermined period of time $T_{SET}$ required for correcting the ignition timing after the detection of acceleration of the vehicle is set.

In a step 103, the value of the engine rotation speed N read in the step 100 is differentiated, that is, $dN/dt$ is computed, and the value of dN is compared with a predetermined reference value $N_{REF}$. When the result of comparison proves that dN is smaller than $N_{REF}$, the basic ignition timing ΔGNM is not corrected.

In a step 104, a correction quantity ΔIGN corresponding to the value of the rotation speed change dN obtained in the step 103 is read out from the memory storing various values of ΔIGN relative to dN as shown in FIG. 2.

In a step 105, judgment is made as to whether the sign of the rotation speed change $dN/dt$ obtained in the step 103 is positive or negative so as to find out whether the engine rotation speed is increasing or decreasing.

When the result of judgment made in the step 105 proves that the engine rotation speed is increasing, the correction quantity ΔIGN obtained in the step 104 is subtracted in a step 106 from the value of the basic ignition timing IGNM to correct the ignition timing.

On the other hand, when the result of judgment made in the step 105 proves that the engine rotation speed is decreasing, the correction quantity ΔIGN obtained in the step 104 is added in a step 107 to the value of the basic ignition timing IGNM to correct the ignition timing.

In a step 108, the value of IGNM read in the step 100 or the value of IGN obtained in the step 106 or 107 is stored at a predetermined address of the memory to prepare for the actual ignition timing control.

In a step 109, judgment is made as to whether or not the period of time T elapsed up to the step 108 is equal to or longer than the predetermined time $T_{SET}$ set in the step 102.

Figure 3:
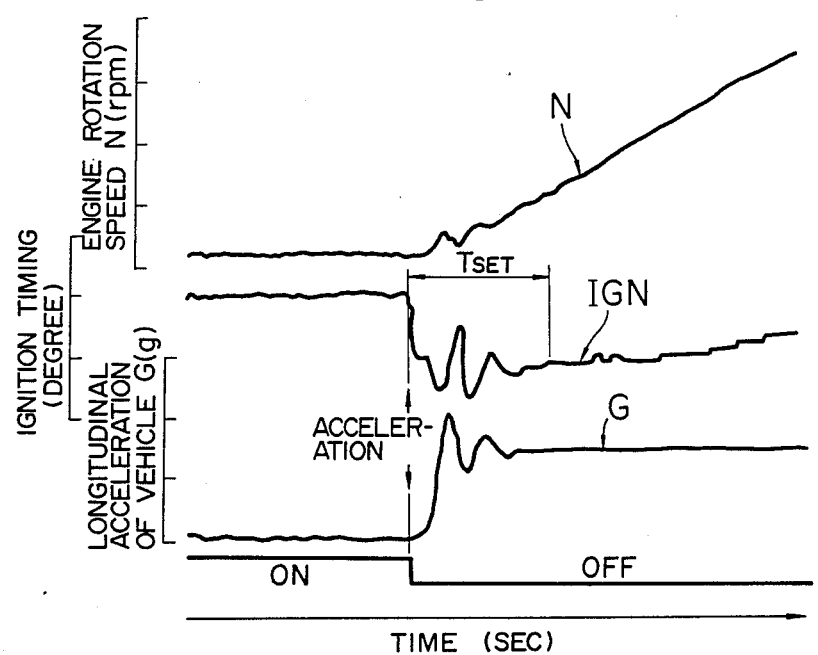
FIGS. 3, 4, 12 and 15 are graphs showing results of various tests conducted on an actual vehicle.
Figure 4:
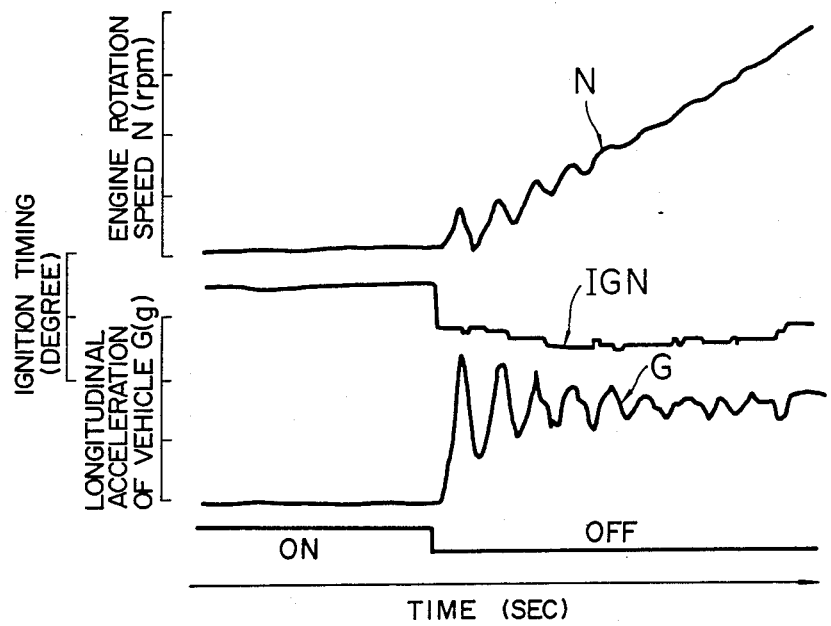

An acceleration performance test according to the basic control described above was conducted on an actual vehicle, and its results are shown in FIG. 3. Also, similar test results according to a prior art manner of ignition timing control are shown in FIG. 4.

As will be apparent from comparison between FIGS. 3 and 4, the acceleration of gravity G in the longitudinal direction of the vehicle does not show a sharp increase, and its later variation is negligible in the case of the ignition timing control according to the present invention. It can thus be seen that an acceleration shock and later vehicle body vibration can be minimized.

Applications of the aforementioned basic ignition timing control will now be described.

Setting of correction time $T_{SET}$

Figure 9:
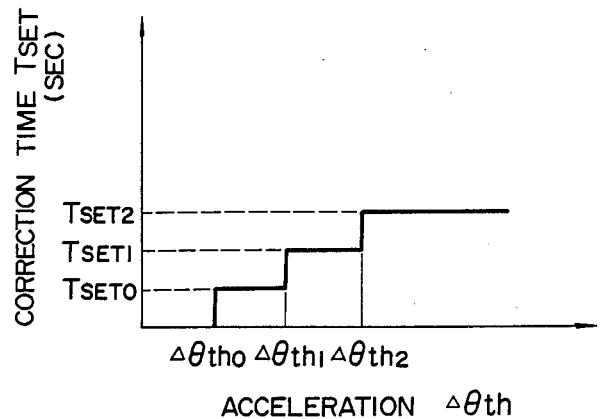

The torque generated from the engine varies depending on the value of acceleration, and the tendency of vibration of the vehicle body is also affected. It is apparent that the larger the value of acceleration, the larger is the value of generated torque, and the tendency of vibration of the vehicle body is further increased. Therefore, the larger the value of acceleration, the period of time $T_{SET}$ required for correcting the basic ignition timing after the detection of acceleration of the vehicle is selected to be longer. A few examples of the setting of the correction time $T_{SET}$ are shown in FIG. 9. This setting $T_{SET}$ is determined depending on the performance of the engine and other factors including the method of engine mounting and the manner of engine suspension.

Setting of ignition timing correction quantity $\Delta IGN$

As described above, the larger the value of acceleration, the torque generated from the engine is larger. Accordingly, the acceleration shock increases, and the later vibration of the vehicle body also increases and lasts for a longer period of time.

Figure 10:
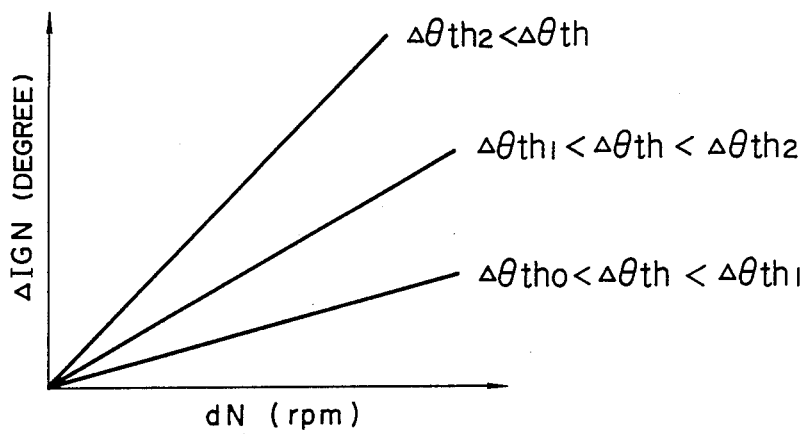

Therefore, the ignition timing correction quantity $\Delta IGN$ is determined according to the value of acceleration. FIG. 10 shows the relation between dN and $\Delta IGN$.

Figure 8:
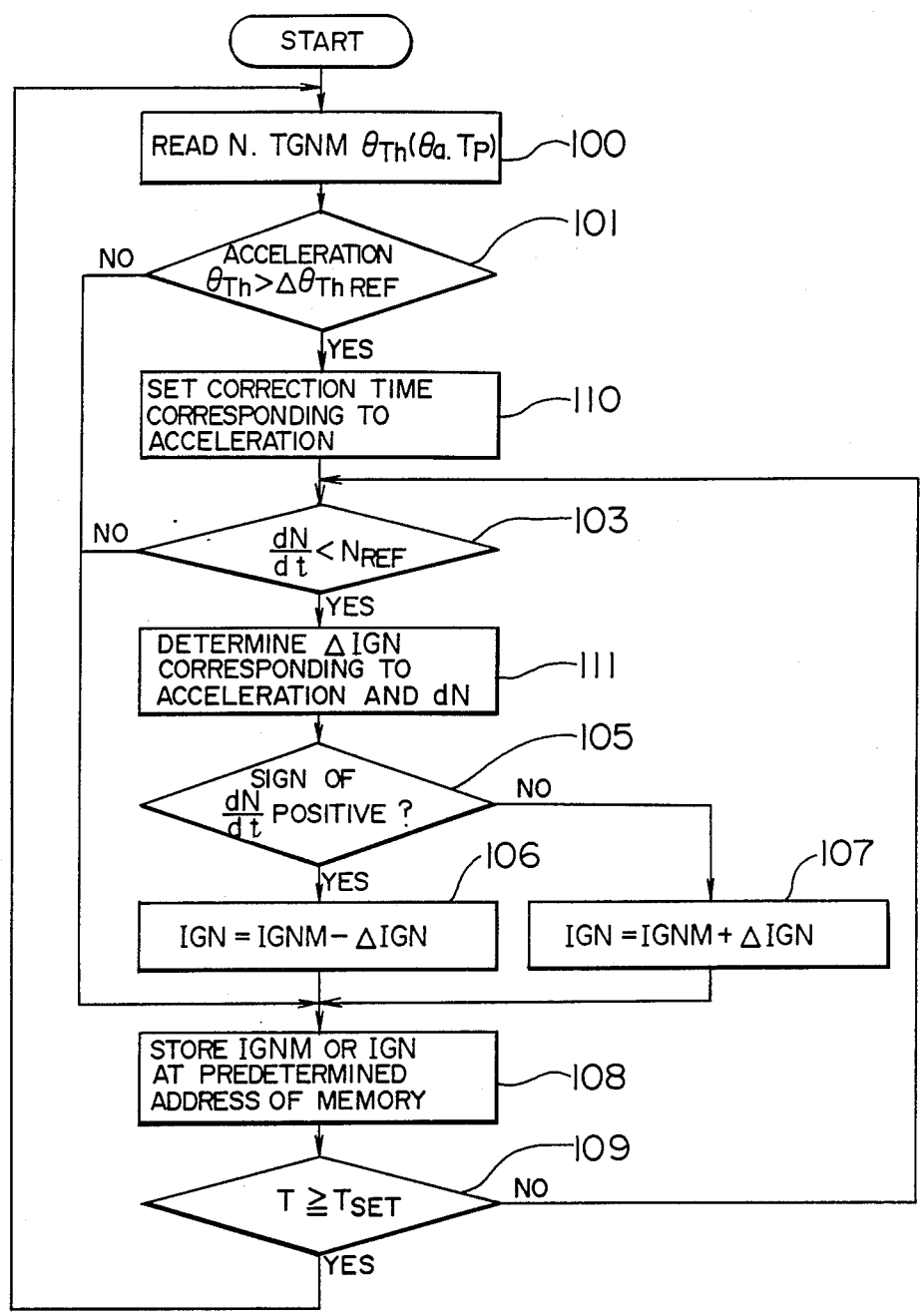

FIG. 8 is a modification of the flow chart shown in FIG. 5 in that the two factors $T_{SET}$ and $\Delta IGN$ described above are taken into account for controlling the ignition timing.

In the flow chart of FIG. 8, steps different from those of the basic flow chart of FIG. 5 will only be described.

In a step 110, a predetermined period of time $T_{SET}$ corresponding to the value of acceleration $\Delta\theta$th detected in the step 101 is read out from the memory storing various values of $T_{SET}$ relative to $\Delta\theta$th as shown in FIG. 9 and is used as the setting.

In a step 111, a correction quantity $\Delta IGN$ corresponding to the value of the rotation speed change $\Delta N$ computed in the step 103 and corresponding also to the value of the acceleration $\Delta\theta$th detected in the step 100 is read out from the memory storing various values of $\Delta IGN$ relative to dN as shown in FIG. 10 and is used as the setting.

The method of ignition timing control according to the flow chart shown in FIG. 8 can deal with all the values of acceleration and exhibits more the effect of the present invention.

Correction depending on gear position

Figure 12:
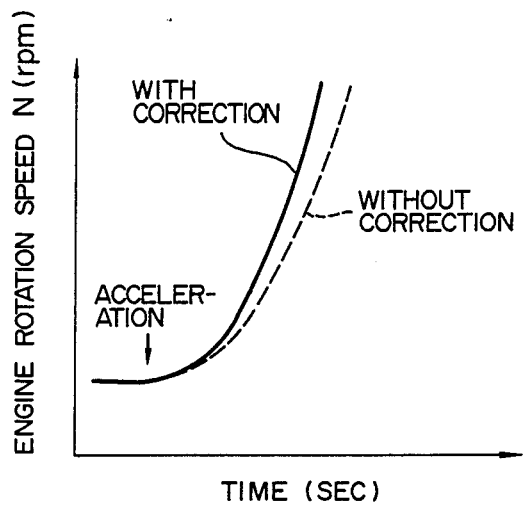

When the engine is racing (that is, when the transmission is in its neutral gear position), the rotation speed of the engine is increasing without being subjected to a variation which appears due to engagement of the gears. Therefore, when the ignition timing control apparatus according to the present invention operates in the racing stage of the engine, the basic ignition timing will be retarded, resulting in loss of the racing performance of the engine as illustrated in FIG. 12 which shows the results of such a test.

Figure 11:
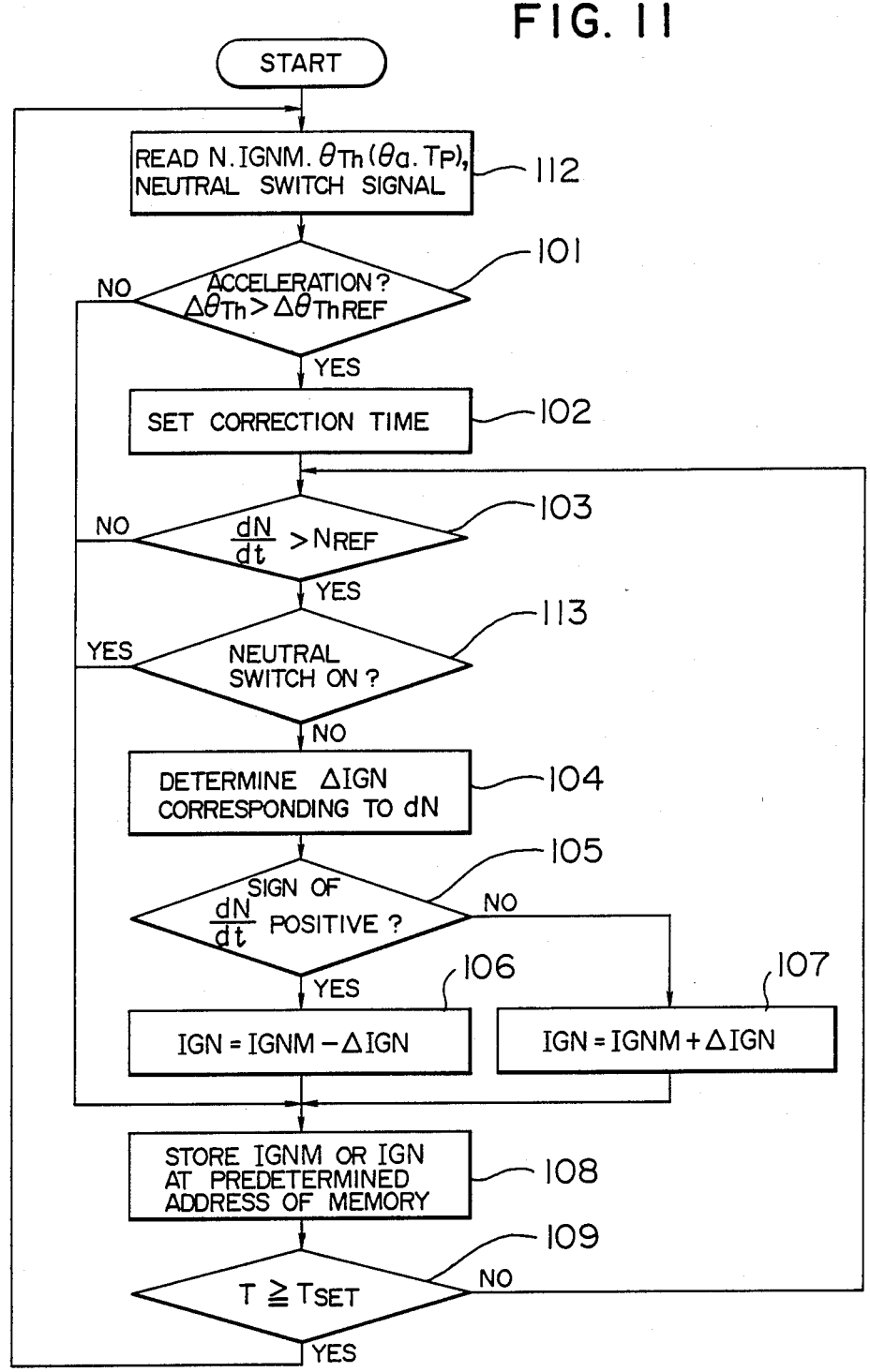

FIG. 11 shows a flow chart of ignition timing control according to the present invention to deal with such a case, so that the ignition timing control may not work even when an acceleration is detected in the neutral gear position of the transmission.

In the flow chart of FIG. 11, steps different from those of the basic flow chart of FIG. 5 will only be described.

In a step 112, the signal from the neutral switch is read in addition to the other variables read in the step 100 of FIG. 5.

In a step 113, judgment is made as to whether the transmission is in its neutral gear position or not. When the neutral switch is in its on position, that is, when the transmission is in its neutral gear position even when the acceleration is detected in the preceding step 103, the ignition timing control according to the present invention is not carried out.

Thus, the racing performance of the engine is not impaired.

Further, a correction quantity $\Delta IGN$ corresponding to a detected gear position may be read out from the memory storing various values of $\Delta IGN$ relative to the gear positions. When the basic ignition timing is corrected depending on the detected gear position, an optimum vibration damping effect can be exhibited at whatever gear position. In the above control, the correction quantity $\Delta IGN$ is selected to be larger at a lower gear position.

Further, a vibration damping effect more than that described above can be exhibited when the predetermined period of time $T_{SET}$ for correcting the ignition timing after detection of acceleration is made variable depending on the gear position. The predetermined period of time $T_{SET}$ described above is selected to be longer at a lower gear position. This is because a greater torque is generated at a lower gear position, and a corresponding large correction quantity $\Delta IGN$ is required.

Setting of correction quantity for timing advance and correction quantity for timing retardation There is an engine in which the basic ignition timing is primarily set at an advance side. When, in such an engine, a correction quantity for ignition timing advance is selected to be equal to a correction quantity for ignition timing retardation as in the case of the basic ignition timing control, knocking tends to occur at the time of ignition timing correction toward the advance side. Further, even when the basic ignition timing is set to satisfy the standard requirement, a matter of apprehension is that the correction for ignition timing advance will give rise to a tendency of occurrence of knocking in the case of acceleration from a low rotation speed range of the engine.

Figure 13:
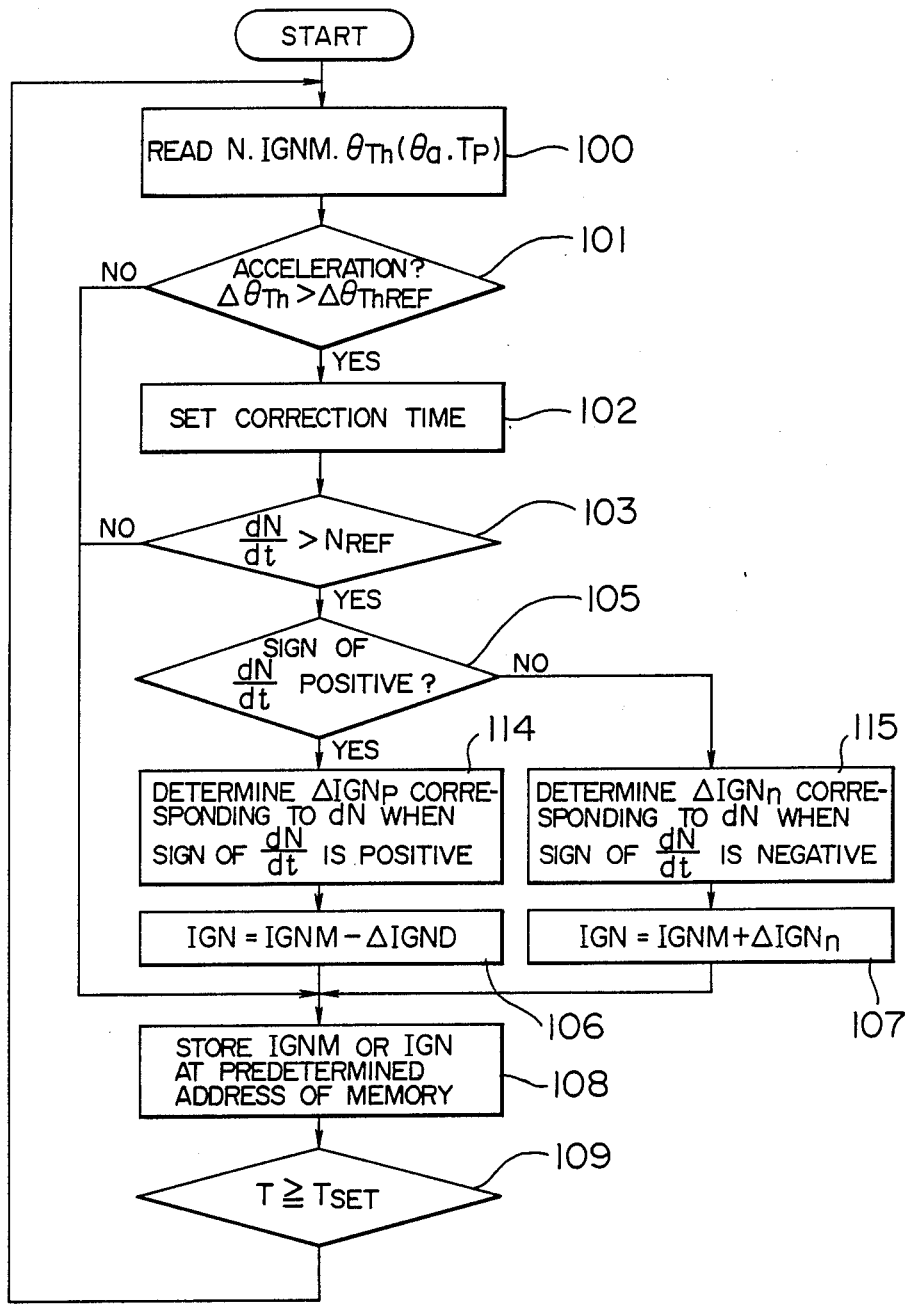

In order to prevent such a tendency, the correction quantity for ignition timing retardation is selected to differ from that for ignition timing advance. FIG. 13 shows a flow chart of such a manner of ignition timing control, and steps different from those of FIG. 5 showing the basic control flow chart will only be described.

Figure 14:
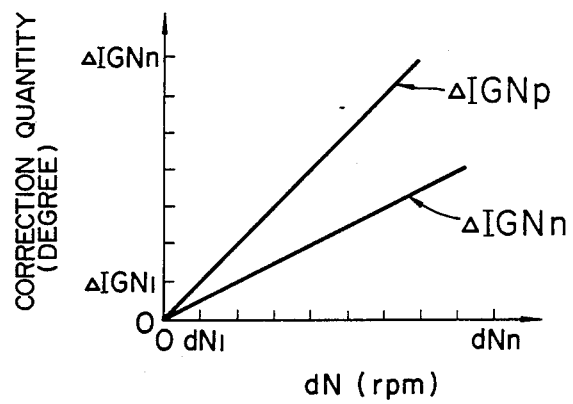

When the result of judgment of the sign of dN/dt in the step 105 proves that the sign is positive, a correction quantity $\Delta IGN_p$ is read out from the memory storing various values of $\Delta IGN$ relative to dN as shown in FIG. 14.

On the other hand, when the result of judgment of the sign of dN/dt in the step 105 proves that the sign is negative, a correction quantity $\Delta IGN_N$ is read out from the memory storing various values of $\Delta IGN$ relative to dN as shown in FIG. 14.

Figure 15:
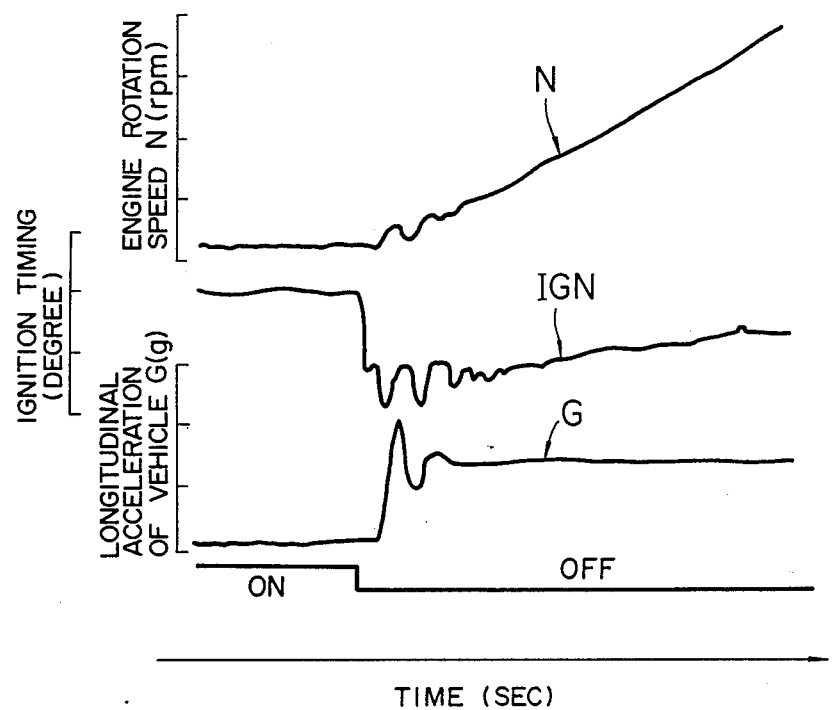

FIG. 15 shows the results of an acceleration performance test conducted on an actual vehicle according to the above manner of control.

It will be apparent from comparison with the results shown in FIG. 3 that a smaller correction quantity is required for the correction of the ignition timing, and an anti-knocking performance can be improved without varying the longitudinal acceleration performance of the vehicle.

Setting of correction region

When the above manner of basic ignition timing control is applied to the engine in its starting stage, the tenacity of the operation of the engine in the starting stage will be reduced. Further, an acceleration shock due to acceleration will not be so large and vibration of the vehicle body will hardly result when the engine is rotating at a high speed. Therefore, the feeling of acceleration will be lost when the basic ignition timing control is applied to the engine operating in such speed ranges.

To avoid the loss of the feeling of acceleration, the ignition timing should be corrected in a predetermined rotation speed range only.

Figure 16:
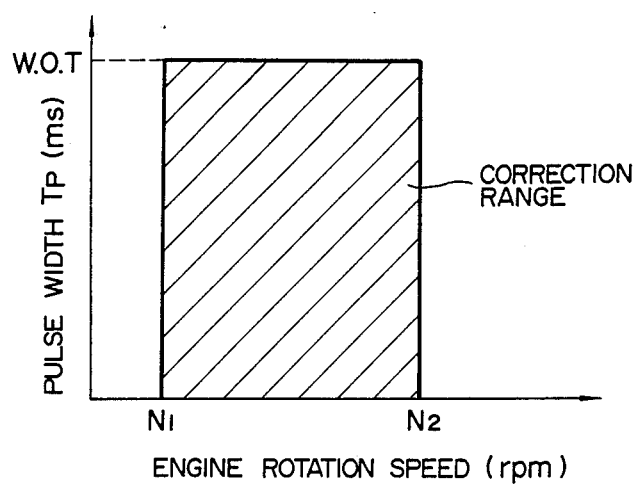

FIG. 16 illustrates that the basic ignition timing control is applied only to an engine rotation speed range between $N_1$ and $N_2$. In the embodiment of the present invention, $N_1$ and $N_2$ are set at 600 rpm and 2400 rpm respectively, for the reasons described above.

Figure 17:
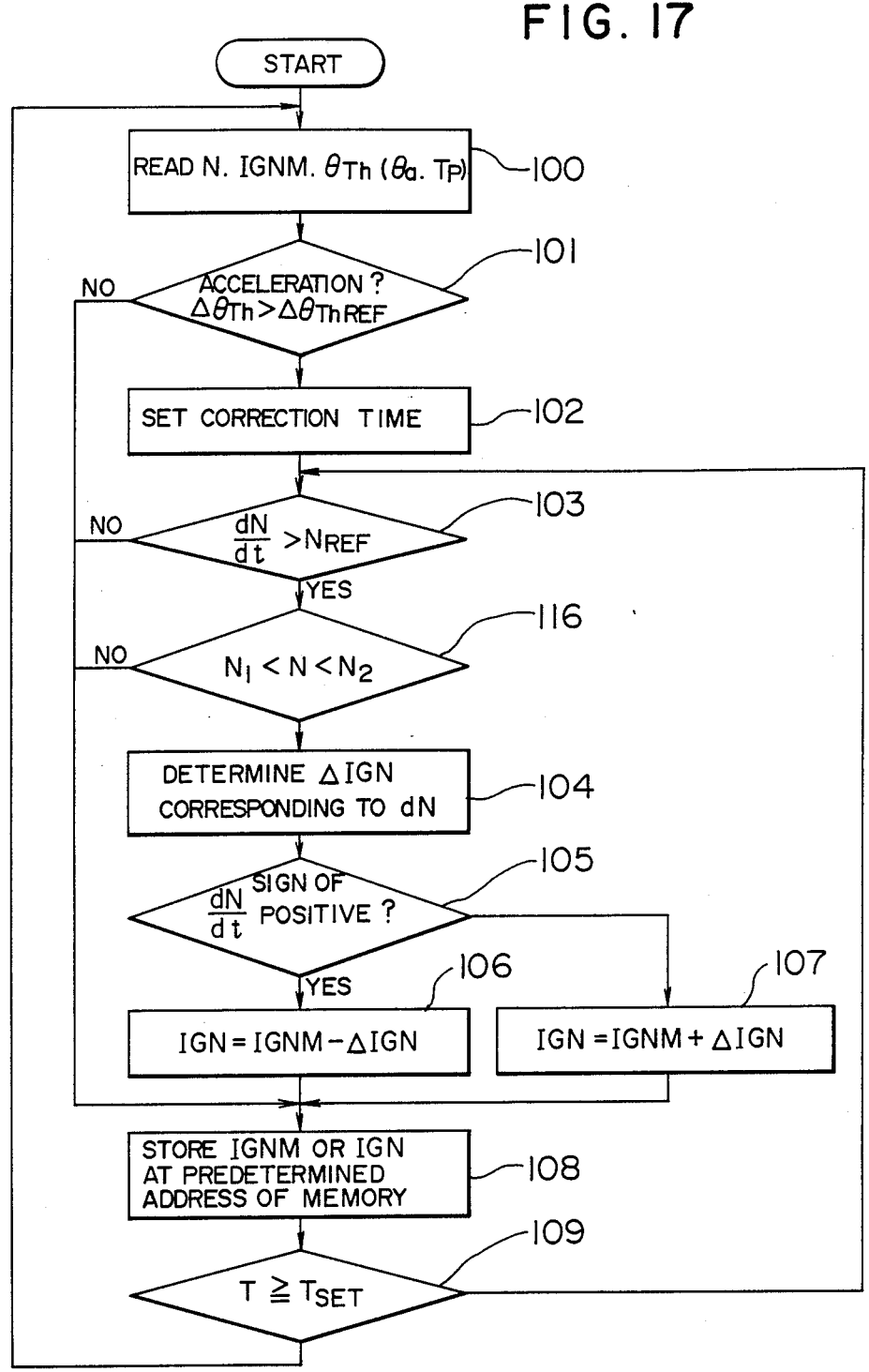

FIG. 17 is a flow chart of ignition timing control based on the above principle. In FIG. 17, the same numerals are used to designate the same steps shown in FIG. 5, and a step different from that of the flow chart of the basic ignition timing control shown in FIG. 5 will only be described.

In a step 116, judgment is made as to whether or not the engine rotation speed N read in the step 100 satisfies the relation $N_1 < N < N_2$. When this relation holds, correction of the ignition timing is required, and the step 116 is followed by the step 104.

Thus, by correcting the ignition timing in an engine speed range where an acceleration shock or vibration of the vehicle body tends to occur, an undesirable reduction of the engine operation performance in other speed ranges due to the application of the basic ignition timing control can be prevented.

Figure 18:
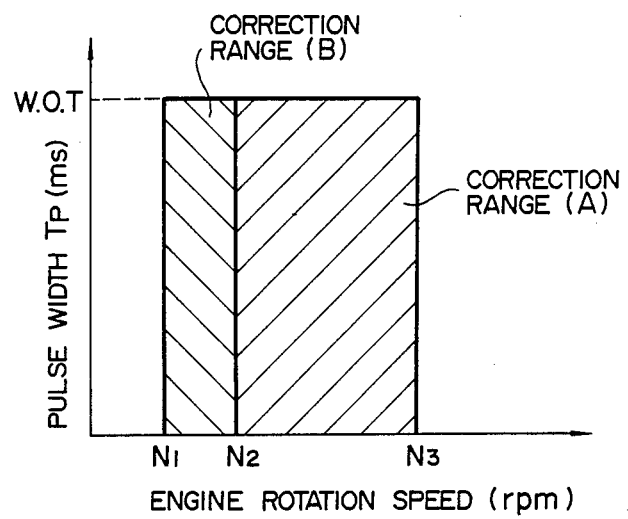

In FIG. 18, there are provided two correction regions (A) and (B). In the correction region (A), the basic ignition timing control is applied to the engine, while in the correction region (B), the ignition timing control shown in FIG. 13 is applied so as to prevent knocking tending to occur during acceleration from a low rotation speed.

It will be understood from the foregoing detailed description of the present invention that the engine rotation speed N at the time of acceleration is differentiated for time t to obtain dN/dt representing a rotation speed variation, and the basic ignition timing is controlled on the basis of the positive or negative increment dN and the sign of dN/dt, thereby controlling the torque so as to minimize the rotation speed variation. Therefore, the present invention is effective for suppressing an acceleration shock and vehicle body vibration at the time of acceleration of a vehicle.

We claim:

1. An ignition timing control apparatus for an internal combustion engine for a vehicle comprising:
    (a) rotation speed detecting means for detecting the rotation speed of the engine;
    (b) speed changing direction discriminating means for discriminating the changing direction of the engine rotation speed;
    (c) ignition timing correction quantity determining means for determining an ignition timing correction quantity corresponding to a positive or negative increment of the engine rotation speed per unit time;
    (d) acceleration detecting means for detecting the operation of the engine accelerating the vehicle; and
    (e) ignition timing correcting means for correcting basic ignition timing on the basis of at least a quantity of ignition timing advance or a quantity of ignition timing retardation determined by said speed changing direction discriminating means and said ignition timing correction quantity determining means after detection of the acceleration;
    wherein said ignition timing correcting means corrects said basic ignition timing such that an elastic vibration of the engine generated by a step-like increment of engine torque at the time of acceleration is eliminated.

2. An ignition timing control apparatus for an internal combustion engine for a vehicle comprising:
    (a) rotation speed detecting means for detecting the rotation speed of the engine;
    (b) speed changing direction discrimination means for discriminating the changing direction of the engine rotation speed;
    (c) ignition timing correction quantity determining means for determining an ignition timing correction quantity corresponding to a positive or negative increment of the engine rotation speed per unit time;
    (d) acceleration detecting means for detecting the operation of the engine accelerating the vehicle; and
    (e) ignition timing correcting means for correcting basic ignition timing on the basis of at least a quantity of ignition timing advance or a quantity of ignition timing retardation determined by said speed changing direction discriminating means and said ignition timing correction quantity determining means after detection of the acceleration;
    wherein said ignition timing correcting means operates for a predetermined period of time after detection of the acceleration.

3. An ignition timing control apparatus according to claim 2, wherein said predetermined period of time is determined on the basis of the value of the acceleration.

4. An ignition timing control apparatus according to claim 1, wherein said ignition timing correction quantity determining means determines the ignition timing correction quantity on the basis of the value of the acceleration.

5. An ignition timing control apparatus for an internal combustion engine for a vehicle comprising:
    (a) rotation speed detecting means for detecting the rotation speed of the engine;

(b) speed changing direction discriminating means for discriminating the changing direction of the engine rotation speed;

(c) ignition timing correction quantity determining means for determining an ignition timing correction quantity corresponding to a positive or negative increment of the engine rotation speed per unit time;

(d) acceleration detecting means for detecting the operation of the engine accelerating the vehicle; and (e) ignition timing correcting means for correcting basic ignition timing on the basis of at least a quantity of ignition timing advance or a quantity of ignition timing retardation determined by said speed changing direction discriminating means and said ignition timing correction quantity determining means after detection of the acceleration;

wherein the ignition timing correction quantity determined by said ignition timing correction quantity determining means differs from that determined when the gear position is not neutral.

6. An ignition timing control apparatus for an internal combustion engine for a vehicle comprising:

(a) rotation speed detecting means for detecting the rotation speed of the engine;

(b) speed changing direction discriminating means for discriminating the changing direction of the engine rotation speed;

(c) ignition timing correction quantity determining means for determining an ignition timing correction quantity corresponding to a positive or negative increment of the engine rotation speed per unit time;

(d) acceleration detecting means for detecting the operation of the engine accelerating the vehicle; and (e) ignition timing correcting means for correcting basic ignition timing of the basis of at least a quantity of ignition timing advance or a quantity of ignition timing retardation determined by said speed changing direction discriminating means and said ignition timing correction quantity determining means after detection of the acceleration;

wherein the ignition timing correction quantity determined by said ignition timing correction quantity determining means differs depending on the gear position.

7. An ignition timing control apparatus according to claim 2, wherein said predetermined period of time is determined depending on the gear position.

8. An ignition timing control apparatus for an internal combustion engine for a vehicle comprising:

(a) rotation speed detecting means for detecting the rotation speed of the engine;

(b) speed changing direction discriminating means for discriminating the changing direction of the engine rotation speed;

(c) ignition timing correction quantity determining means for determining an ignition timing correction quantity corresponding to a positive or negative increment of the engine rotation speed per unit time;

(d) acceleration detecting means for detecting the operation of the engine accelerating the vehicle; and (e) ignition timing correcting means for correcting basic ignition timing on the basis of at least a quantity of ignition timing advance or a quantity of ignition timing retardation determined by said speed changing direction discriminating means and said ignition timing correction quantity determining means after detection of the acceleration;

wherein said quantity of ignition timing advance and said quantity of ignition timing retardation differ from each other.

9. An ignition timing control apparatus for an internal combustion engine for a vehicle comprising:

(a) rotation speed detecting means for detecting the rotation speed of the engine;

(b) speed changing direction discriminating means for discriminating the changing direction of the engine rotation speed;

(c) ignition timing correction quantity determining means for determining an ignition timing correction quantity corresponding to a positive or negative increment of the engine rotation speed per unit time;

(d) acceleration detecting means for detecting the operation of the engine accelerating the vehicle; and (e) ignition timing correcting means for correcting basic ignition timing on the basis of at least a quantity of ignition timing advance or a quantity of ignition timing retardation determined by said speed changing direction discriminating means and said ignition timing correction quantity determining means after detection of the acceleration;

wherein, when the engine is rotating at a speed lower than a predetermined value at starting time of acceleration although the acceleration is detected, the ignition timing is not corrected.

10. An ignition timing control apparatus according to claim 1, wherein, when the engine is rotating at a speed higher than a predetermined value at starting time of acceleration although the acceleration is detected, the ignition timing is not corrected.

* * * * *